Aug. 10, 1937.  C. T. PERKINS  2,089,928
CAR HEATER AND WINDSHIELD DEFROSTER
Filed Feb. 11, 1937
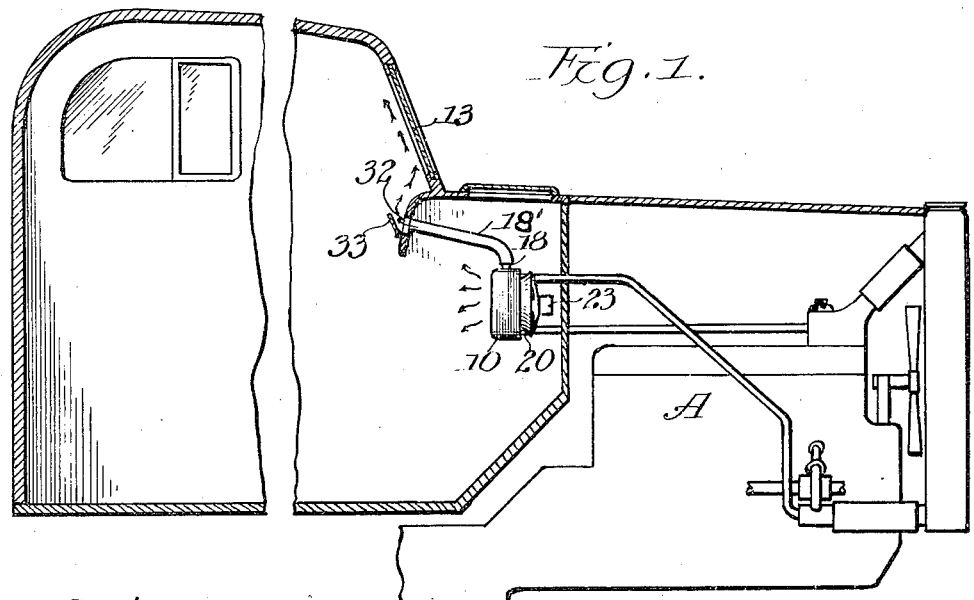
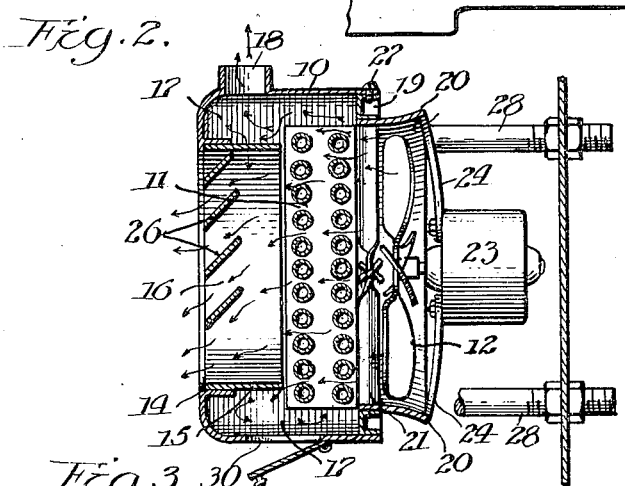
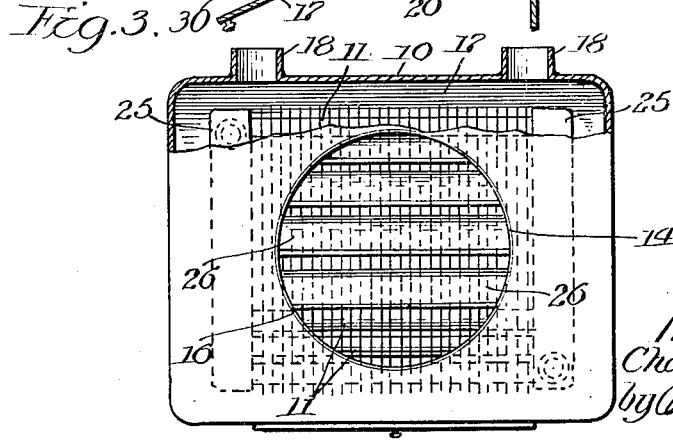
Inventor
Charles T. Perkins Patented Aug. 10, 1937

2,089,928

UNITED STATES PATENT OFFICE 2,089,928

CAR HEATER AND WINDSHIELD DEFROSTER

Charles T. Perkins, Racine, Wis., assignor to Modine Manufacturing Co., Racine, Wis., a corporation of Wisconsin Application February 11, 1937, Serial No. 125,189

3 Claims. (Cl. 257—137)

This invention primarily relates to a unit heater, and particularly to that type employed for heating the interior of a vehicle body having a wind shield, and provides means for delivering a portion of the heated air to a surface of the wind shield to cause removal of condensate ice or frost from the wind shield and eliminate its formation thereon.

The invention has as one of its principal objects the provision of a construction whereby air currents developed by an air advancing means are divided in proper ratio to effect defrosting of the wind shield and heating of the interior of the vehicle body.

It is also an object of the invention to provide and employ a plenum chamber arranged to allow a portion of that air introduced to the unit heater casing to be heated and introduced to the plenum chamber and be served therefrom to a surface of the wind shield at a pressure above atmospheric pressure to prevent the formation and freezing of condensate upon the wind shield.

A further object of this invention resides in the provision of means whereby heated air from the plenum chamber may be introduced to a selected part of the vehicle body interior.

Another object of the invention is to provide a unit heater capable of functioning as above described, which involves a casing having a plenum chamber and an air outlet adapted to serve heated air under pressure above atmospheric pressure to a wind shield, which includes a heat exchange device and air advancing means combined therewith, the casing having a second air outlet providing means through which air independent of that air contained in said plenum chamber may be discharged from said casing to the interior of said vehicle body.

In this respect the invention has as another object to provide means for preventing a pressure loss through leakage backwardly past the air advancing means.

Another object of the invention is to combine an air straightening device and a Venturi ring with a unit heater of the character described for locking in the air pressure developed in the plenum chamber.

The invention has these and other objects, all of which will be explained in detail and more readily understood when read in conjunction with the accompanying drawing, which illustrates one embodiment of which the invention is susceptible, it being evident that the invention is susceptible to changes and modifications without departing from the spirit of the appended claims forming a part hereof.

In the drawing, Fig. 1 is a central section through a vehicle body having a wind shield, and showing the application of this invention thereto;

Fig. 2 is a vertical sectional view of the unit heater shown in Fig. 1; and

Fig. 3 is a front view of the device shown in Fig. 2, certain parts being broken away to more clearly illustrate structural details.

Referring now particularly to the accompanying drawing in which like numerals indicate like parts throughout the several views, the numeral 10 designates the casing of the unit. Mounted in the casing is a heat exchange device 11 provided with an air advancing means 12. This air advancing means is of the single impeller type and therefore will materially reduce the drain on the battery as compared with the double impeller type of air advancing means now commonly utilized in combined automobile heaters and defrosters.

The heat exchange device 11 consists of the usual radiator core between two headers 25 and is mounted across the open rear of the casing or shell 10 so as to leave a space between the front face of the core and the front wall of the casing. In the front wall of the casing is an outlet opening 14, and extending rearwardly from the edge of the outlet opening to the front face of the heat exchange device is a ring-like member 15. This ring-like member serves as a partition wall dividing the space within the casing ahead of the heat exchange device into a discharge passage or chamber 16 and a plenum chamber 17.

Inasmuch as the cross sectional area of the discharge passage is smaller than the area of the radiator core, only part of the heated air issuing from the core is discharged through the passage 16 directly into the space to be heated. The remainder of the heated air issuing from the core enters the plenum chamber 17 to provide a plenum of warm air.

Outlet openings 18, located, in the present instance, in the top wall of the casing, provide for the attachment of ducts 18' which conduct the heated air from the plenum chamber to the windshield, or to any other desired localized area. These outlet openings have a combined area considerably less than the area of the radiator core portion surrounding the discharge passage 16 and through which the heated air enters the plenum chamber, and as back leakage is prevented in a manner to be hereinafter described, the pressure built up in the plenum chamber is substantial. The heated air discharged through the ducts 18' thus moves under positive pressure to impinge the windshield with effective insistence.

The open rear of the casing or shell 10 may be closed entirely by the heat exchange device, or, as in the present instance, by a wall 19 having an opening commensurate in size with the area of the core of the heat exchange device to provide for the admission of air to the core. The air advancing means 12, which consists of a single impeller driven by a motor 23 is mounted in back of the core to drive air through the opening in the wall 19 and into the core. Supporting arms 24 attached to the motor 23 and secured to a Venturi ring 20 extending rearwardly from the wall 19, mount the air impeller in proper relation to the core.

The Venturi ring 20 in conjunction with an air straightening device 21 consisting of a plurality of radial blades pitched oppositely to the blades of the impeller and disposed between the core and the impeller, constitutes means for preventing loss of pressure in the plenum chamber through a backward or rearward leakage of air. In other words, the presence of the Venturi ring and the air straightener prevents the pressure built up in the plenum chamber when the air advancing means is in operation from relieving itself by backing out through the core. The air is thus "locked in" the plenum chamber to insure the desired positive pressure therein.

The headers 25 of the heat exchange device may be connected with the circulatory system of the vehicle's internal combustion engine A, or supplied with a heating fluid in any other suitable manner.

Mounted in the mouth of the air discharge passage 16 are deflecting vanes 26 of any desired construction. Preferably, these vanes are adjustable to permit manual control of the direction of the flow of air discharged into the space being heated, but as the specific construction of these vanes and manner of their adjustment forms no part of this invention, it has not been illustrated.

Preferably, the heat exchange device together with the air straightening means, the air advancing means, and the Venturi ring are assembled as a unit on the end wall 19, and this wall is in turn readily detachably secured in the rear of the casing 10, as by screws 27. To mount the entire structure, the usual supports 28 are provided. These may be the ducts leading to the headers of the heat exchange device or they may be separate brackets secured to the rear wall 19.

From the foregoing description taken in connection with the accompanying drawing, it will be apparent that when the air advancing means is in operation, air gathered at the Venturi ring 20 will be forced through the straightening device 21 and into the heat exchange device in a direct forward path. As the air passes through the core of the heat exchange device, it is heated and some of it is discharged directly into the interior of the car through the discharge passage 16, the remainder entering the plenum chamber 17 from which it is conducted to the windshield or any other localized area.

If desired, the plenum chamber 17 may be provided with an outlet opening in addition to its openings 18 to release part of the air into the interior of the vehicle. Such an opening has been illustrated at 30 in the bottom wall of the casing. Where it is provided, it is preferably equipped with a closure, which when open may be used to give the air issuing from the opening 30 a definite direction.

The ducts 18' which convey the heated air to the windshield terminate in openings 32 in the instrument panel or dashboard of the vehicle, and to control the discharge of air from these openings, they are provided with closures 33.

What I claim as my invention is:—

1. In an automobile heater of the character described: a casing having an air discharge opening in its front wall and having its rear substantially open; a radiator core across the open rear of the casing and having its front face spaced inwardly from the front wall of the casing; a motor driven air impeller arranged in back of the radiator core for forcing air through the core and into the casing; a partition wall extending from the front wall of the casing to the front face of the radiator core to divide the space between the front wall of the casing and the front face of the radiator core into a discharge passage for directly discharging part of the air issuing from the radiator core, and a plenum chamber to receive the remainder of the air issuing from the radiator core, said plenum chamber having an outlet for the discharge of air therefrom; and means cooperating with the impeller for maintaining a substantially uniform pressure area over the rear of the core to insure the maintenance of substantial pressure within the plenum chamber as long as the air impeller is in operation.

2. In a heater of the character described, the combination of: a radiator core; a radiator shell assembled with the radiator core with a portion thereof disposed forwardly of the front face of the radiator core, the front wall of the shell having an air outlet opening smaller than the area of the radiator core; a wall extending from the perimeter of said opening to the front face of the radiator core to define a discharge passage for part of the air issuing from the front of the radiator core, and cooperating with the walls of the shell and the heat exchange device to define a plenum chamber for the reception of the remainder of the air issuing from the front of the radiator core; a motor driven air advancing means for forcing air forwardly through the radiator core; means cooperating with the air advancing means for maintaining a substantially uniform pressure area over the rear face of the core to insure the maintenance of substantial pressure within the plenum chamber; and said plenum chamber having an outlet leading therefrom.

3. In a device of the character described, the combination of: a heat exchange device including a radiator core; a plurality of separated chambers at the discharge side of the core, each of which is bounded in part by the core so that air issuing from the core enters said chambers, one of said chambers constituting a plenum chamber substantially surrounding the other, and the other having a large discharge opening so that air forced into said chambers from the core sets up a differential pressure therein; an air advancing means at the opposite side of the core for forcing air through the core and into said chambers; and means at said last named side of the core cooperating with the air advancing means for maintaining a substantially uniform pressure area over said last named side of the core to insure the maintenance of substantial pressure within the plenum chamber, said last named means comprising an air straightener positioned between the air advancing means and the core, and a shroud ring closely surrounding the air advancing means.

CHARLES T. PERKINS.